US008549861B2

(12) United States Patent
Huffman

(10) Patent No.: US 8,549,861 B2
(45) Date of Patent: Oct. 8, 2013

(54) METHOD AND APPARATUS TO ENHANCE TRANSITION DUCT COOLING IN A GAS TURBINE ENGINE

(75) Inventor: Marcus B. Huffman, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 663 days.

(21) Appl. No.: 12/349,994

(22) Filed: Jan. 7, 2009

(65) Prior Publication Data

US 2010/0170259 A1 Jul. 8, 2010

(51) Int. Cl.
*F02C 1/00* (2006.01)

(52) U.S. Cl.
USPC ............................................. 60/760; 60/752

(58) Field of Classification Search
USPC .......... 60/752, 754, 755, 756, 757, 758, 759, 60/760
See application file for complete search history.

(56) References Cited

U.S. PATENT DOCUMENTS

| | | | | | |
|---|---|---|---|---|---|
| 2,958,194 | A | * | 11/1960 | Bayler | 60/760 |
| 3,016,703 | A | * | 1/1962 | Morris et al. | 60/752 |
| 3,175,361 | A | * | 3/1965 | Schirmer et al. | 60/746 |
| 3,572,031 | A | * | 3/1971 | Szetela | 60/757 |
| 3,702,058 | A | * | 11/1972 | De Corso et al. | 60/757 |
| 3,706,203 | A | * | 12/1972 | Goldberg et al. | 60/757 |
| 4,018,046 | A | * | 4/1977 | Hurley | 60/264 |
| 4,195,474 | A | | 4/1980 | Bintz et al. | |
| 4,361,010 | A | * | 11/1982 | Tanrikut et al. | 60/757 |
| 4,422,288 | A | | 12/1983 | Steber | |
| 4,719,748 | A | * | 1/1988 | Davis et al. | 60/39.37 |
| 4,872,312 | A | * | 10/1989 | Iizuka et al. | 60/760 |
| 5,237,813 | A | | 8/1993 | Harris et al. | |
| 5,724,816 | A | * | 3/1998 | Ritter et al. | 60/752 |
| 5,737,922 | A | * | 4/1998 | Schoenman et al. | 60/752 |
| 5,758,504 | A | * | 6/1998 | Abreu et al. | 60/754 |
| 5,906,093 | A | | 5/1999 | Coslow et al. | |
| 5,933,699 | A | * | 8/1999 | Ritter et al. | 419/6 |
| 6,018,950 | A | * | 2/2000 | Moeller | 60/752 |
| 6,098,397 | A | * | 8/2000 | Glezer et al. | 60/772 |
| 6,173,561 | B1 | | 1/2001 | Sato et al. | |
| 6,220,036 | B1 | | 4/2001 | Inada et al. | |
| 6,298,656 | B1 | | 10/2001 | Donovan et al. | |
| 6,314,716 | B1 | * | 11/2001 | Abreu et al. | 60/773 |
| 6,412,268 | B1 | | 7/2002 | Cromer et al. | |

(Continued)

FOREIGN PATENT DOCUMENTS

| | | | |
|---|---|---|---|
| CN | 87101982 | A | 10/1987 |
| CN | 88101760 | A | 10/1988 |

(Continued)

OTHER PUBLICATIONS

Search Report and Written Opinion from EP Application No. 09180630.7 dated Sep. 12, 2012.

*Primary Examiner* — Phutthiwat Wongwian
*Assistant Examiner* — Michael B Mantyla
(74) *Attorney, Agent, or Firm* — Armstrong Teasdale LLP

(57) ABSTRACT

A method and apparatus are described that include a transition piece including a cooling sleeve. The cooling sleeve includes a first end and an opposite second end, the cooling sleeve is coupled to an inner wall of the transition piece, such that an annular passage is defined between the inner wall and the cooling sleeve. The first end defines an annular inlet and second end defines an annular outlet.

17 Claims, 7 Drawing Sheets

(56) References Cited

U.S. PATENT DOCUMENTS

| | | | | |
|---|---|---|---|---|
| 6,526,756 | B2 * | 3/2003 | Johnson et al. | 60/772 |
| 6,553,766 | B2 | 4/2003 | Shimizu et al. | |
| 6,568,187 | B1 * | 5/2003 | Jorgensen et al. | 60/752 |
| 6,571,560 | B2 * | 6/2003 | Tatsumi et al. | 60/753 |
| 6,640,547 | B2 * | 11/2003 | Leahy, Jr. | 60/752 |
| 6,746,755 | B2 * | 6/2004 | Morrison et al. | 428/166 |
| 6,769,257 | B2 | 8/2004 | Kondo et al. | |
| 6,860,098 | B2 * | 3/2005 | Suenaga et al. | 60/39.23 |
| 6,890,148 | B2 | 5/2005 | Nordlund | |
| 7,137,241 | B2 * | 11/2006 | Martling et al. | 60/39.37 |
| 7,178,341 | B2 | 2/2007 | Zborovsky et al. | |
| 7,310,938 | B2 * | 12/2007 | Marcum et al. | 60/39.37 |
| 7,707,835 | B2 * | 5/2010 | Lipinski et al. | 60/752 |
| 7,757,492 | B2 * | 7/2010 | Intile et al. | 60/752 |
| 7,908,867 | B2 * | 3/2011 | Keller et al. | 60/753 |
| 8,033,119 | B2 * | 10/2011 | Liang | 60/806 |
| 8,151,570 | B2 * | 4/2012 | Jennings et al. | 60/759 |
| 2003/0204944 | A1 * | 11/2003 | Norek | 29/421.1 |
| 2009/0252907 | A1 * | 10/2009 | Keller et al. | 428/34.6 |

FOREIGN PATENT DOCUMENTS

| | | | |
|---|---|---|---|
| CN | 101220964 | A | 7/2008 |
| EP | 1245788 | A2 | 10/2002 |
| GB | 2361302 | A | 10/2001 |
| WO | 9857044 | A1 | 12/1998 |
| WO | 2009103658 | A1 | 8/2009 |

* cited by examiner

METHOD AND APPARATUS TO ENHANCE TRANSITION DUCT COOLING IN A GAS TURBINE ENGINE

BACKGROUND OF THE INVENTION

This invention relates generally to gas turbine engines and more particularly to methods and systems to enhance transition duct cooling within gas turbine engines.

At least some known gas turbine engines ignite a fuel-air mixture in a combustor to generate a combustion gas stream that is channeled to a turbine via a hot gas flow path. Compressed air is channeled to the combustor from a compressor. Known combustor assemblies generally use fuel nozzles that channel fuel and air to a combustion region of the combustor. The turbine converts the thermal energy of the combustion gas stream to mechanical energy that rotates a turbine shaft. The output of the turbine may be used to power a machine, for example, an electric generator or a pump.

At least some known combustor assemblies include a transition duct or transition piece that channels combustion gases from the combustor assembly towards the turbine assemblies. At least some known transition ducts include perforated cooling sleeves that surround the transition piece to channel cooling air for cooling of the transition piece. However, known cooling sleeves may cause uneven cooling of the transition pieces which may increase temperature gradients that may reduce the operational life of the combustor hardware. As a result, portions of the combustor may require replacement more frequently than if the transition piece was more uniformly cooled. To compensate for higher temperatures and/or thermal gradients, some known combustors include components fabricated from materials that are more resistant to thermal stresses and/or wear. However, such components increase the costs and/or weight to the engine, as compared to engines having combustors that do not include such components.

Other known combustor assemblies include a cooling system for the transition duct that includes a hollow cooling sleeve. Known cooling sleeves include a plurality of channels and elaborate cooling passages formed therein that channel cooling flow around the transition piece to facilitate cooling thereof. However, such cooling sleeves are generally difficult to fabricate and increase the manufacturing costs of the combustor assembly. Moreover, the complex cooling circuits included within such sleeves may reduce cooling performance if any of the cooling passages become obstructed and/or plugged by contaminants. Reduced cooling effectiveness may cause increased operating temperatures, increased thermal gradients, and/or increased thermal stresses in the transition piece. To accommodate higher temperatures and/or thermal gradients, at least some known combustors include components that are fabricated from materials that are more resistant to thermal fatigue. However, other such components may be more expensive to manufacture as compared to components that are fabricated without such materials.

BRIEF DESCRIPTION OF THE INVENTION

In one aspect, a method for assembling a gas turbine engine is provided. The method comprises coupling a cooling sleeve including a first end and an opposite second end to an inner wall of a combustor assembly such that an annular passage is defined between the inner wall and the cooling sleeve. An annular inlet is formed adjacent to the first end and an annular outlet is formed adjacent to the second end.

In another aspect, a transition piece is provided. The transition piece includes a cooling sleeve that comprises a first end and an opposite second end. The cooling sleeve is coupled to an outer surface of an inner wall of the transition piece, such that an annular passage is defined between the inner wall and the cooling sleeve. The first end defines an annular inlet and the second end defines an annular outlet.

In a further aspect, a gas turbine engine is provided. The engine comprises a compressor and a combustor coupled in flow communication with the compressor. The combustor comprises at least one transition piece, the transition piece further comprising an inner wall and a cooling sleeve. The cooling sleeve comprises a first end and an opposite second end, the cooling sleeve coupled to the inner wall, such that an annular passage is defined between the inner wall and the cooling sleeve. The first end defines an annular inlet and the second end defines an annular outlet.

DETAILED DESCRIPTION OF THE INVENTION

Figure 1:
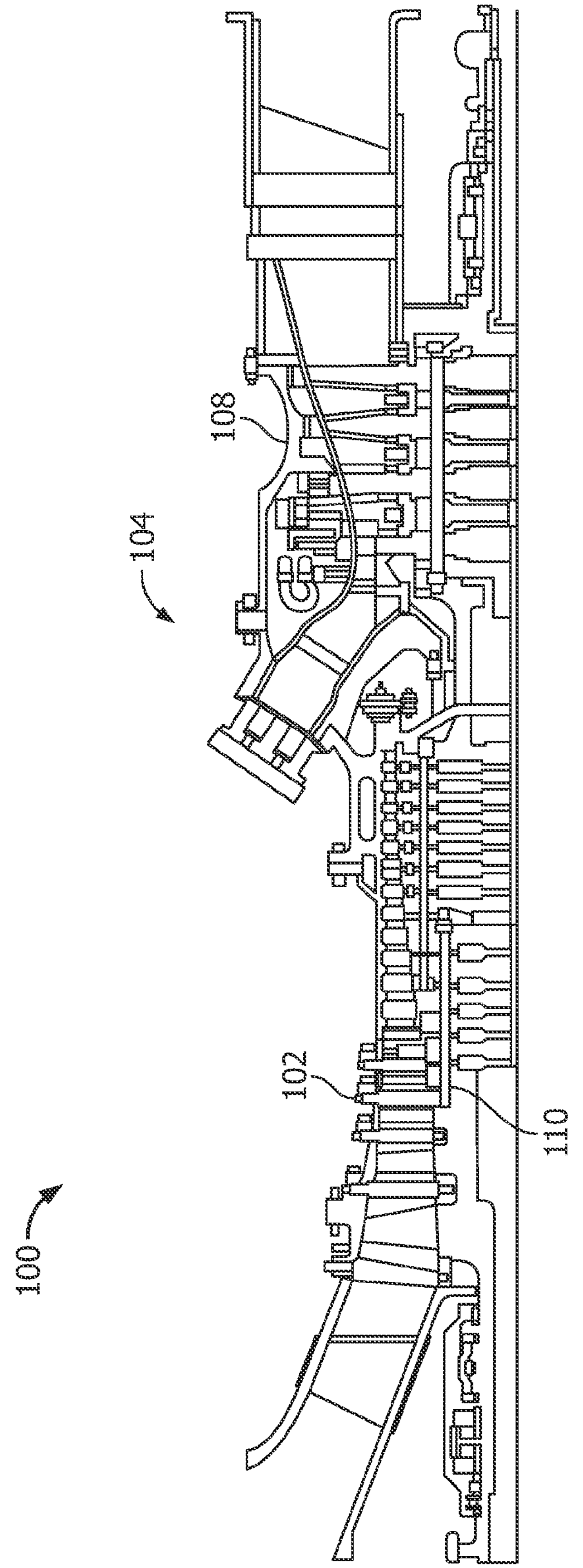
FIG. 1 is a schematic view of an exemplary gas turbine engine.

FIG. 1 is a schematic illustration of an exemplary gas turbine engine 100. Engine 100 includes a compressor 102 and a combustor assembly 104. Engine 100 also includes a turbine 108 and a common compressor/turbine shaft 110 (sometimes referred to as a rotor).

In operation, air flows through compressor 102 such that compressed air is supplied to combustor assembly 104. Fuel is channeled to a combustion region (not shown) defined within combustor assembly 104 wherein the fuel is mixed with the air and the mixture ignited. Combustion gases generated are channeled to turbine 108, wherein thermal energy is converted to mechanical rotational energy. Turbine 108 is rotatably coupled to shaft 110.

Figure 2:
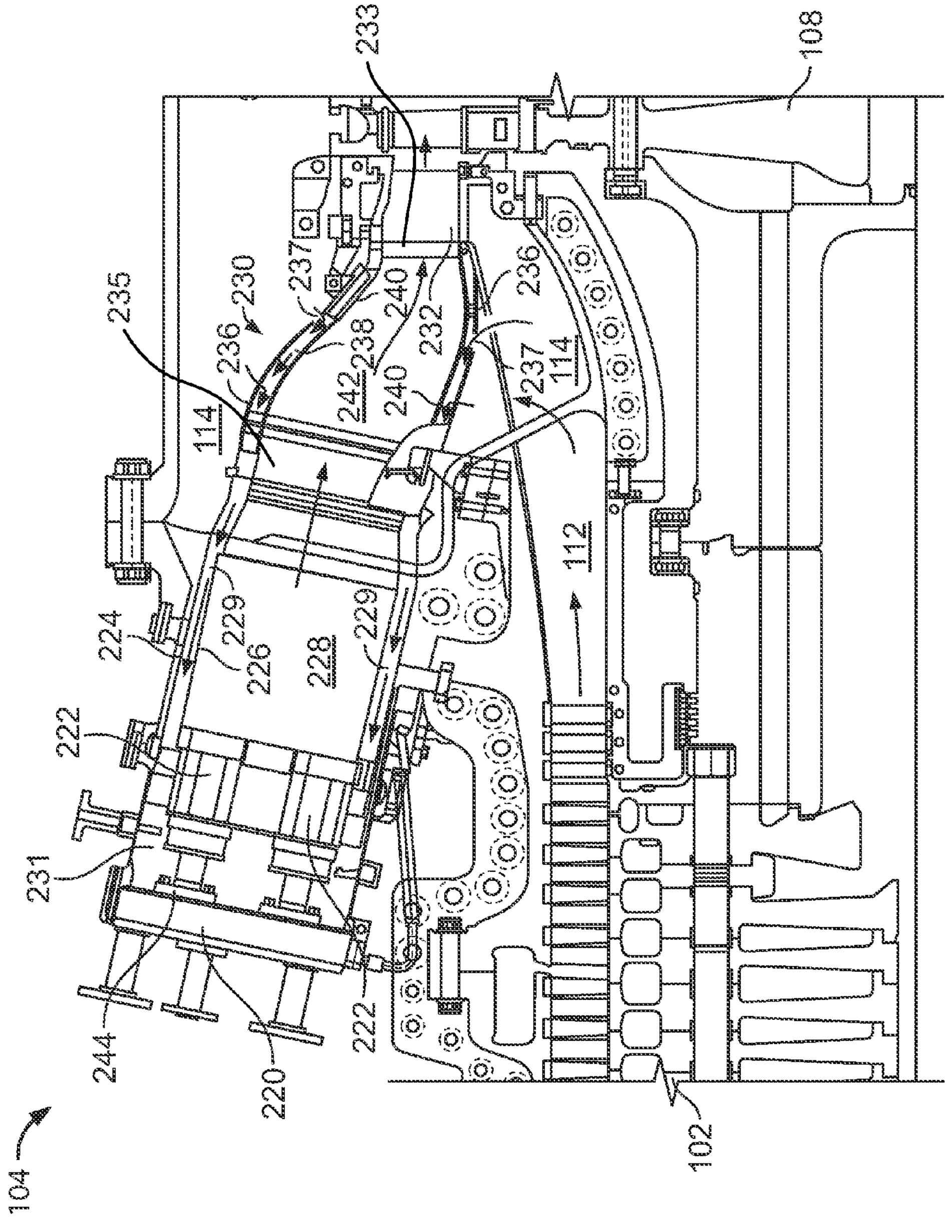
FIG. 2 is a cross-sectional schematic view of an exemplary combustor that may be used with the gas turbine engine shown in FIG. 1.

FIG. 2 is a cross-sectional schematic view of a portion of combustor assembly 104. Combustor assembly 104 is coupled in flow communication with turbine assembly 108 and with compressor assembly 102. Compressor assembly 102 includes a diffuser 112 and a compressor discharge plenum 114 that are coupled in flow communication with each other.

In the exemplary embodiment, combustor assembly 104 includes an end cover 220 that provides structural support to a plurality of fuel nozzles 222. End cover 220 is coupled to combustor casing 224 with retention hardware (not shown in FIG. 2). A combustor liner 226 is coupled radially inward from casing 224 such that liner 226 defines a combustion chamber 228. An annular combustion chamber cooling passage 229 extends between combustor casing 224 and combustor liner 226.

A transition duct or transition piece 230 is coupled to combustor chamber 228 to channel combustion gases generated in chamber 228 towards turbine nozzle 232. In the exemplary embodiment, transition piece 230 is fabricated as a double-walled duct that includes an outer wall 236 and a radially inner wall 240. Transition piece 230 also includes an annular passage 238 defined between the inner wall 240 and outer wall 236. Inner wall 240 also defines a guide cavity 242 for combustion gases. More specifically, in the exemplary embodiment, transition piece 230 extends between a combustion chamber outlet end 235 of each combustion chamber 228 and an inlet end 233 of turbine nozzle 232 to channel combustion gases into turbine 108.

In operation, turbine assembly 108 drives compressor assembly 102 via shaft 110 (shown in FIG. 1). As compressor assembly 102 rotates, compressed air is discharged into diffuser 112 as illustrated in FIG. 2 with arrows. In the exemplary embodiment, a majority of air discharged from compressor assembly 102 is channeled through compressor discharge plenum 114 towards combustor assembly 104, and the remaining portion of compressed air is channeled downstream for use in cooling engine 100 components. More specifically, pressurized compressed air within plenum 114 is channeled into transition piece 230 via passage 238. Air is then channeled from transition piece annular passage 238 into combustion chamber cooling passage 229 prior to being discharged from passage 229 into fuel nozzles 222.

Fuel and air are mixed and ignited within combustion chamber 228. Casing 224 facilitates isolating combustion chamber 228 from the outside environment, for example, surrounding turbine components. Combustion gases generated are channeled from chamber 228 through transition piece guide cavity 242 towards turbine nozzle 232. In one exemplary embodiment, fuel nozzle assembly 222 is coupled to end cover 220 via a fuel nozzle flange 244.

Figure 3:
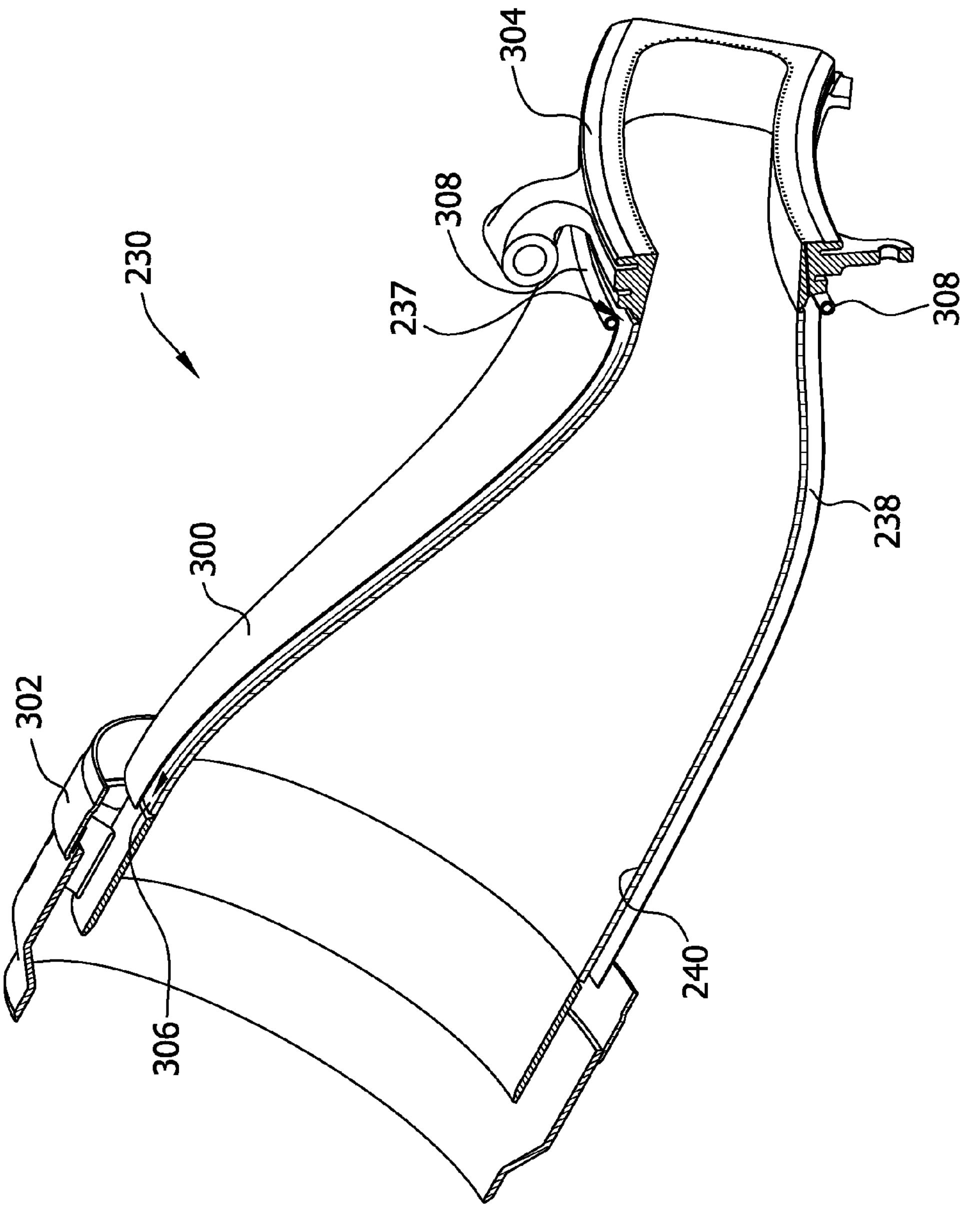
FIG. 3 is an enlarged cross-sectional schematic view of an exemplary transition piece including a cooling sleeve that may be used with the combustor shown in FIG. 2.

FIG. 3 is an enlarged cross-sectional view of transition piece 230 including a cooling sleeve 300. Cooling sleeve 300 is sized to circumscribe an inner wall 240 of transition piece 230, such that an annular passage 238 is defined there between. Alternatively, annular passage 238 may define other spatial gaps as required by the particular cooling application. In the exemplary embodiment, cooling sleeve 300 extends from a forward frame 302 to an aft frame 304. In other embodiments, various configurations and structural aft frames (not shown) may be used in accordance with the cooling sleeve 300 described herein. An annular passage inlet 237 is defined adjacent to aft frame 304. Inlet 237 circumscribes annular passage 238. A corresponding annular passage outlet 306 is defined adjacent to forward frame 302. Cooling sleeve 300 is substantially solid in configuration and generally devoid of apertures along its length and circumference. In the exemplary embodiment, a rounded inlet tube 308 is positioned adjacent to passage inlet 237 to provide structural support to inlet 237, as well as facilitate channeling cooling airflow into passage 238.

Figure 4:
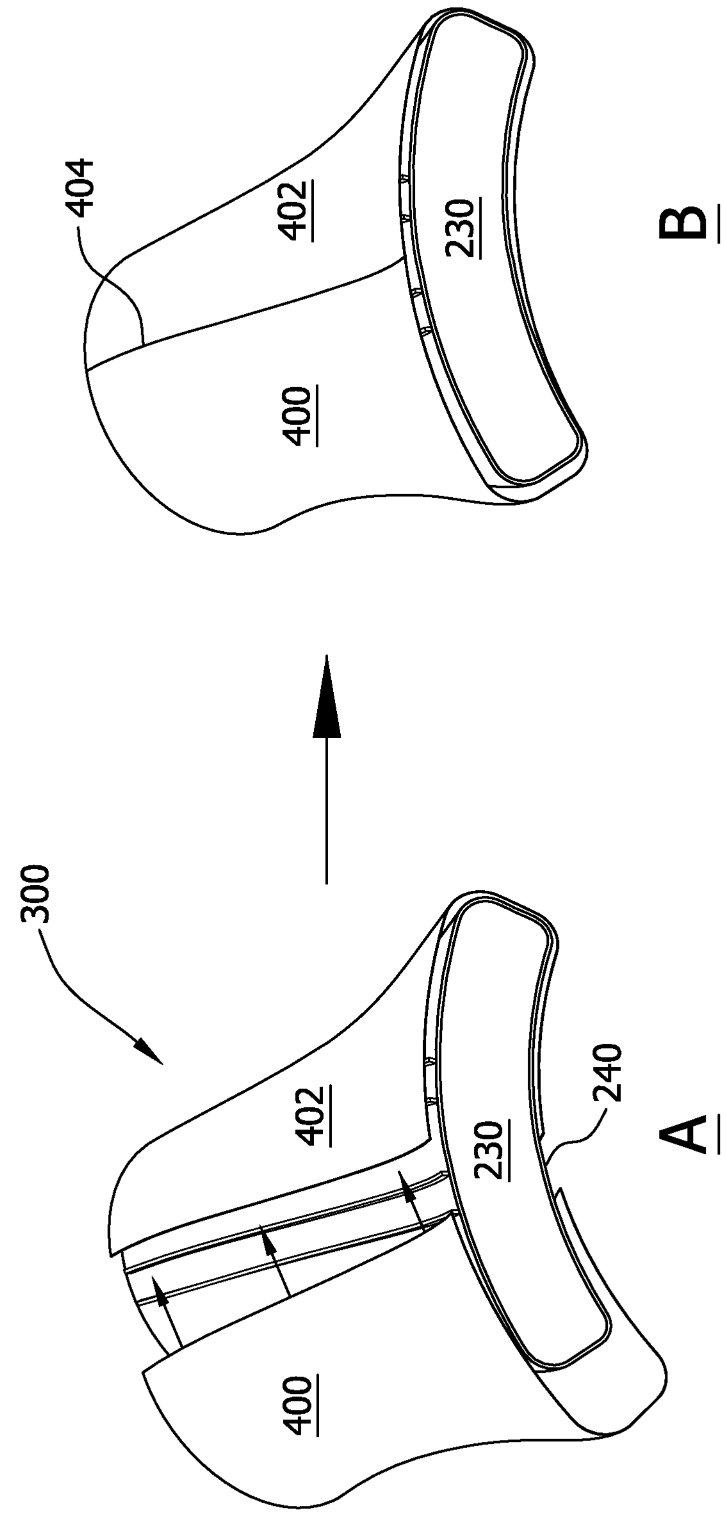
FIG. 4 is a perspective assembly view of an exemplary cooling sleeve that may be used with the combustor shown in FIG. 1.

In one embodiment, as shown in FIG. 4, cooling sleeve 300 may be fabricated as a multi-piece assembly that is assembled about transition piece inner wall 240. In such an embodiment, cooling sleeve 300 includes a first member 400 and an opposing second member 402. More specifically, in the exemplary embodiment, second member 402 is a mirror-image component of first member 400. As shown in FIG. 4, first member 400 extends about approximately one half of transition piece 230 and second member 402 extends about a second half of transition piece 230. When coupled together both first and second members (400 and 402) form a seam 404 that extends substantially along a central axis of transition piece 230. First and second members 400 and 402 may be joined at seam 404 by one or more mechanical fastening methods such as, but not limited to, bolting, seam welding, metal forming (crimping), or any combination thereof. In other embodiments, seam 404 may be formed at other locations with respect to transition piece 230. For example, cooling sleeve 300 may include a plurality of ring members (not shown) that extend circumferentially about transition piece 230 and provide structural support to transition piece 230.

Figure 5:
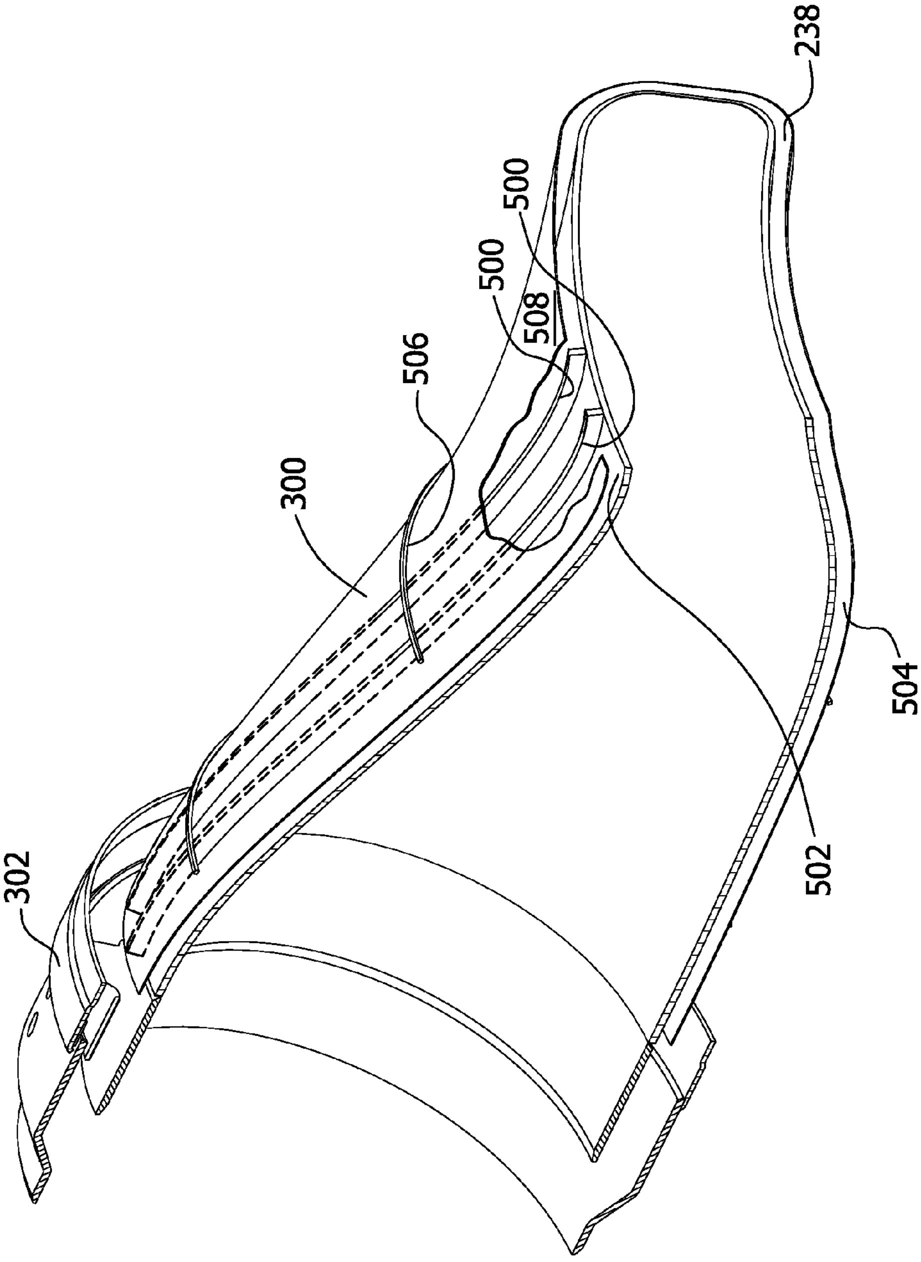
FIG. 5 is a partial cut away view of an exemplary cooling sleeve that may be used with the combustor shown in FIG. 1.

FIG. 5 illustrates a partial cut away view of an exemplary cooling sleeve that may be used with the combustor shown in FIG. 1. In the exemplary embodiment, sleeve 300 includes a plurality of axial ribs 500 that are positioned within annular passage 238 to provide structural support to cooling sleeve 300. Axial ribs 500 may be coupled to an outer surface 502 of transition piece 230, or alternatively, axial ribs 500 may be coupled to an inner surface 504 of cooling sleeve 300. A number, height, and spacing of axial ribs 500 is variably selected based on particular cooling requirements, pressure drop requirements, and structural requirements.

A cooling requirement is defined but not limited to as required fluid properties, mass flow rate, flow velocity and resulting heat transfer characteristics to produce the required material absolute temperatures and temperature gradients. A pressure drop requirement is defined but not limited to as required difference between inlet and outlet pressures in order to meet system performance requirements. A structural requirement is defined but not limited to as absolute material temperature capability, thermal gradient fatigue capability, thermal deflection, vibration deflection and vibration fatigue capability In another embodiment, circumferential ribs 506 may be formed integrally with cooling sleeve 300. For example, circumferential ribs 506 may extend outwardly from, and circumscribe, an outer surface 508 of cooling sleeve 300. Alternatively, circumferential ribs 506 may extend from cooling sleeve inner surface 504 within annular passage 238. A number, height, and spacing of ribs 506 is variably selected based on particular cooling requirements, pressure drop requirements, and structural requirements.

Figure 6:
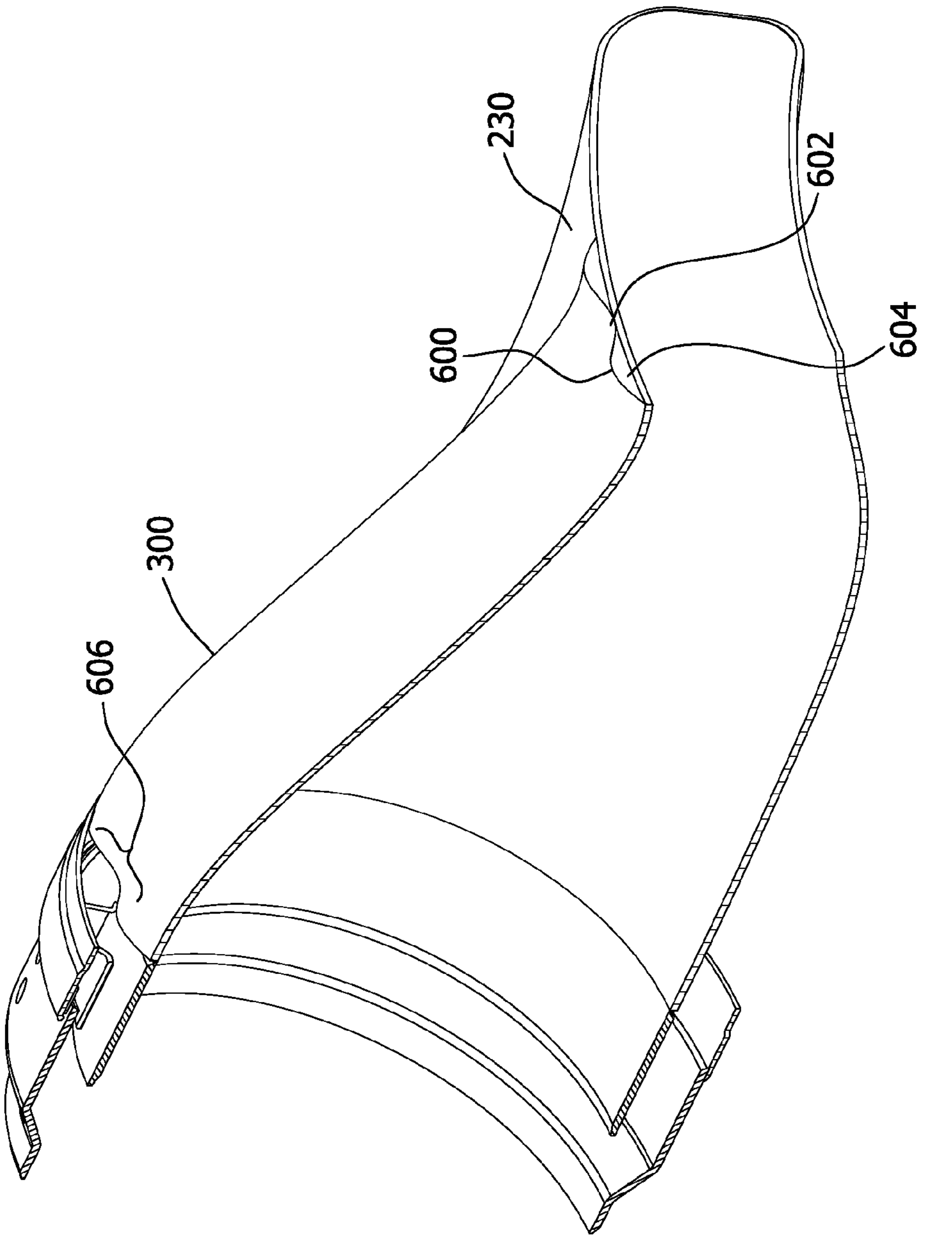
FIG. 6 is a perspective assembly view of an exemplary corrugated cooling sleeve that may be used with the combustor shown in FIG. 1.

FIG. 6 illustrates a perspective assembly view of an exemplary corrugated cooling sleeve that may be used with the combustor shown in FIG. 1. In the exemplary embodiment, cooling sleeve 300 is corrugated and includes an undulating outer surface formed with alternating peaks 600 and valleys 602. Cooling passage 604 is formed between the peak 600 and valley 602 such that a plurality of corrugations 606 are spaced circumferentially around the cooling sleeve 300. The number, height, and spacing of the corrugations 606 is variably selected based on particular cooling requirements, pressure drop requirements, and structural requirements.

Figure 7:
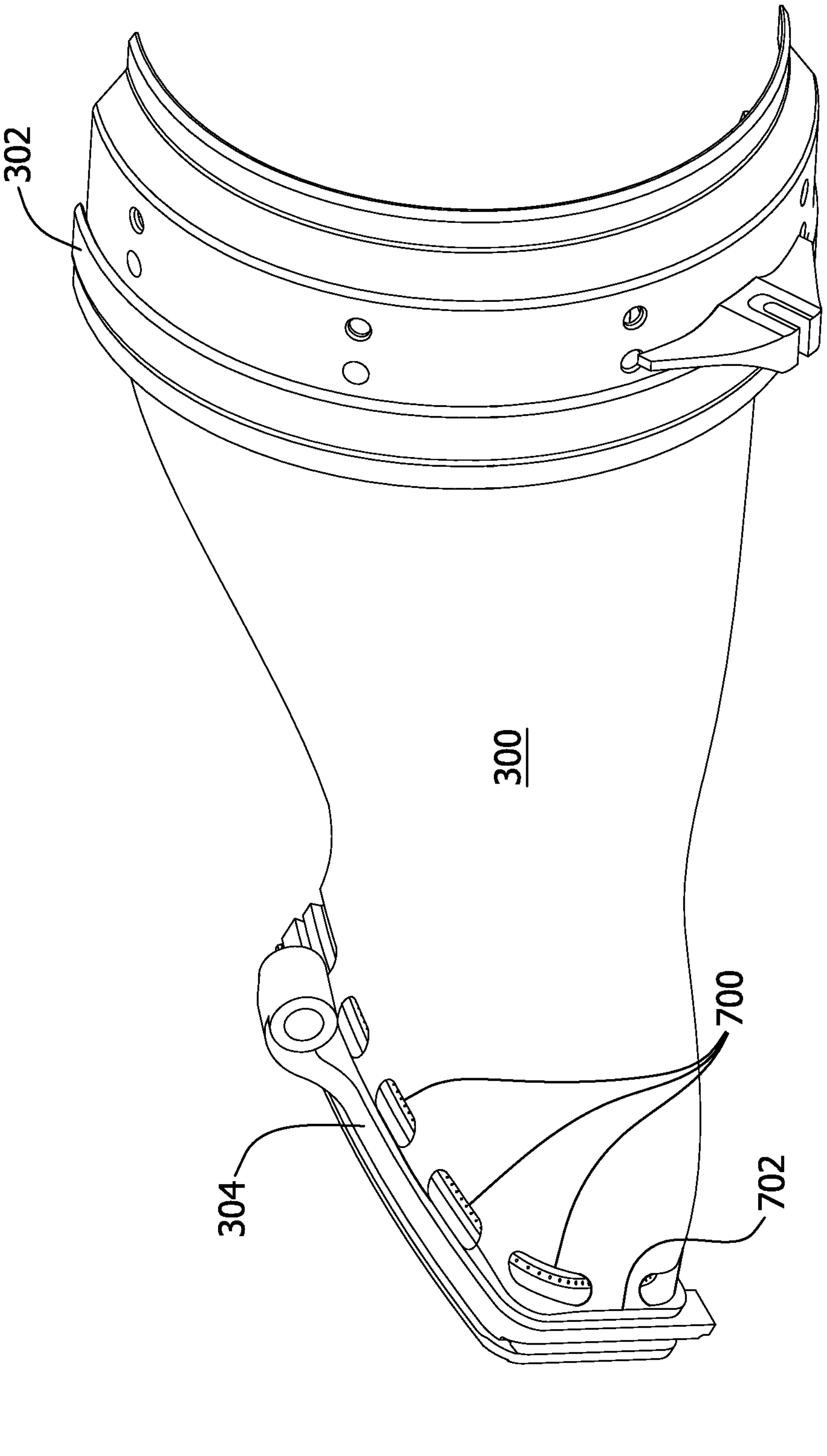
FIG. 7 is perspective assembly view of an exemplary cooling sleeve including an alternative cooling air inlet.

FIG. 7 is perspective assembly view of an exemplary cooling sleeve including an alternative cooling air inlet. In the exemplary embodiment, cooling sleeve 300 is formed such that passage 237 includes a plurality of apertures 700 defined therein. Apertures 700 are defined adjacent to aft frame 304. In the exemplary embodiment, cooling sleeve 300 extends into a retention slot 702 formed in aft frame 304. Apertures 700 are circumferentially-spaced about cooling sleeve 300 and are adjacent to aft frame 304. Each aperture 700 extends thru cooling sleeve 300 and into annular passage 238. A number, shape, and spacing of apertures 700 is variably selected based on the particular cooling requirements, pressure drop requirements, and structural requirements of sleeve 300.

During operation, cooling sleeve 300 provides an annular passage 238 for cooling fluid to flow there through. In the exemplary embodiment, cooling fluid flows from a compressor discharge plenum 114 (shown in FIG. 1) into passage 238 via annular inlet 237 and/or apertures 700. Cooling fluid then flows through passage 238 to facilitate convective heat transfer between transition duct 230 and the cooling fluid. In one embodiment, axial ribs 500 positioned within annular passage provide structural reinforcement of cooling sleeve 300 and facilitate enhanced heat transfer between cooling fluid and the transition duct. In operation, apertures 700 enable cooling fluid flow to be channeled into annular passage 238. Circumferential ribs 506 provide structural support for cooling sleeve 300. During operation when ribs 506 are positioned within passage 238, an aerodynamic trip is formed that alters the fluid dynamic flow within passage 238 and increases heat transfer therein.

The invention described herein provides several advantages over known transition duct cooling sleeves. For example, thermal stresses are reduced due to the increased simplicity of the cooling sleeve. Moreover, the cooling sleeve described herein has increased average heat transfer and more uniform cooling as a result of the uniform cooling fluid flow within the annular passage. In addition, high cycle fatigue caused by stress concentrations and/or non-uniform cooling is facilitated to be reduced. Furthermore, overall combustor system pressure drop is facilitated to be reduced by providing simple duct flow between the cooling sleeve and the transition duct. In addition, the cooling sleeve facilitates a more controllable and a more quantifiable heat transfer rate as a result of increased and more uniform heat transfer cooling fluid flow.

Exemplary embodiments of methods and systems to enhance transition duct cooling in a gas turbine engine are described above in detail. The methods and systems are not limited to the specific embodiments described herein, but rather, components of systems and/or steps of the methods may be utilized independently and separately from other components and/or steps described herein. For example, the methods may also be used in combination with other cooling systems and methods, and are not limited to practice with only the transition duct cooling systems and methods as described herein. Rather, the exemplary embodiment can be implemented and utilized in connection with many other cooling applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention can be practiced with modification within the spirit and scope of the claims.

What is claimed is:

1. A method for assembling a gas turbine engine, said method comprising:

coupling a cooling sleeve including a first end and an opposite second end to an inner wall of a combustor assembly such that an annular passage is defined between the inner wall and the cooling sleeve, wherein the inner wall defines a transition piece of the combustor assembly and the cooling sleeve is defined by a solid wall extending from the first end to the second end;

orienting at least one rib on an inner surface of the cooling sleeve substantially axially between the first and second ends such that the at least one rib circumscribes the cooling sleeve and supports the cooling sleeve;

forming an annular inlet adjacent to the first end located at a downstream end of the transition piece;

coupling a rounded inlet tube adjacent to the annular inlet to support the annular inlet and to facilitate channeling a cooling fluid flow into the annular passage; and forming an annular outlet adjacent to the second end.

2. A method in accordance with claim 1, further comprising forming the cooling sleeve, wherein forming the cooling sleeve further comprises coupling a first member and a second member about the inner wall along at least one seam, wherein the first member is coupled to the second member using at least one of a mechanical fastener, a crimping process, and a welding process.

3. A method in accordance with claim 1, further comprising coupling at least one axial rib to the inner wall such that the at least one axial rib extends at least partially into the annular passage.

4. A method in accordance with claim 1, wherein orienting the at least one rib further comprises orienting the at least one rib to facilitate increasing heat transfer between the inner wall and the cooling sleeve.

5. A method in accordance with claim 1, wherein the at least one rib is formed integrally with the cooling sleeve to the inner wall.

6. A method in accordance with claim 1, wherein forming the annular passage inlet further comprises forming at least one aperture in the cooling sleeve adjacent to the annular passage such that the aperture facilitates channeling said cooling fluid flow into the annular passage.

7. A transition piece for use with a turbine engine, said transition piece comprising:

an inner wall of a combustor assembly, said inner wall configured to channel combustion gases from a combustor chamber toward a turbine nozzle;

a cooling sleeve comprising a first end and an opposite second end, said cooling sleeve coupled to said inner wall, such that an annular passage is defined between said inner wall and said cooling sleeve, said cooling sleeve being defined by a solid wall extending from said first end to said second end, said first end being a downstream end of said cooling sleeve and defining an annular inlet, said second end defining an annular outlet, said cooling sleeve further comprising a rounded inlet tube adjacent to said annular inlet for supporting said annular inlet, and to facilitate channeling a cooling fluid flow into the annular passage; and at least one rib oriented on an inner surface of said cooling sleeve substantially axially between the first and second ends such that said at least one rib circumscribes said cooling sleeve and supports said cooling sleeve.

8. A transition piece in accordance with claim 7, wherein said cooling sleeve comprises a first member and a second member that are each coupled substantially circumferentially about said inner wall along at least one seam, said first member is coupled to said second member using at least one of a mechanical fastener, a crimping process, and a welding process.

9. A transition piece in accordance with claim 7, wherein said annular passage further comprises at least one axial rib that extends at least partially into said annular passage from at least one wall.

10. A transition piece in accordance with claim 7 wherein said at least one rib is formed integrally with said cooling sleeve.

11. A transition piece in accordance with claim 7, wherein said at least one rib facilitates increasing heat transfer between said inner wall and said cooling sleeve.

12. A transition piece in accordance with claim 7, wherein said cooling sleeve is defined by a corrugated surface, said corrugated surface facilitates increasing a structural strength of said cooling sleeve.

13. A transition piece in accordance with claim 7, wherein said annular passage inlet comprises at least one aperture defined therein, said at least one aperture facilitates channeling said cooling fluid flow into said annular passage.

14. A gas turbine engine assembly comprising:

a compressor; and a combustor coupled in flow communication with said compressor, said combustor comprising at least one transition piece, said transition piece comprising:

an inner wall, said inner wall configured to channel combustion gases from a combustor chamber toward a turbine nozzle;

a cooling sleeve comprising a first end and an opposite second end, said cooling sleeve coupled to said inner wall such that an annular passage is defined between said inner wall and said cooling sleeve, said cooling sleeve being defined by a solid wall extending from said first end to said second end, said first end being a downstream end of said cooling sleeve and defining an annular inlet, said second end defining an annular outlet, said cooling sleeve further comprising a rounded inlet tube adjacent to said annular inlet for supporting said annual inlet, and to facilitate channeling a cooling fluid flow into the annular passage; and at least one rib coupled to an inner surface of said cooling sleeve between the first and second ends such that said at least one rib circumscribes said cooling sleeve to support said cooling sleeve.

15. A gas turbine engine assembly in accordance with claim 14, wherein said cooling sleeve comprises a first member and a second member that are each coupled about said inner wall along at least one seam, said first member is coupled to said second member using at least one of a mechanical fastener, a crimping process, and a welding process.

16. A gas turbine engine assembly in accordance with claim 14, wherein said transition piece further comprises at least one axial rib extending at least partially into said annular passage from at least one wall defining said annular passage.

17. A gas turbine engine assembly in accordance with claim 14, wherein said at least one rib is formed integrally with said cooling sleeve.

* * * * *